United States Patent

Makino et al.

Patent Number: 5,827,404
Date of Patent: Oct. 27, 1998

[54] METHOD AND APPARATUS FOR SOLVENT RECOVERY FROM WASTE WASH LIQUID OF PRINTING MACHINE

[75] Inventors: Katsuaki Makino; Hiromitsu Soeda; Isao Matsuura, all of Hiroshima; Katsutoshi Okazaki, Mihara, all of Japan

[73] Assignee: Mitsubishi Jukogyo Kabushiki Kaisha, Tokyo, Japan

[21] Appl. No.: 742,662

[22] Filed: Nov. 5, 1996

[30] Foreign Application Priority Data

Dec. 7, 1995 [JP] Japan .................................. 7-318979

[51] Int. Cl.$^6$ ................................ B01D 3/00; B01D 3/02
[52] U.S. Cl. ........................ 203/99; 202/175; 202/176; 202/177; 202/180; 202/185.1; 202/197
[58] Field of Search ...................... 202/175, 176, 202/177, 180, 197, 185.1; 203/40, 99

[56] References Cited

U.S. PATENT DOCUMENTS

| | | | |
|---|---|---|---|
| 1,466,535 | 8/1923 | Kyrides | 202/175 |
| 2,881,116 | 4/1959 | Siegfried | 203/40 |
| 4,406,745 | 9/1983 | Martel | 202/162 |
| 4,664,754 | 5/1987 | Caputi et al. | 203/39 |
| 5,062,926 | 11/1991 | Maeda et al. | 202/183 |
| 5,323,705 | 6/1994 | Durrnagel | 101/424 |
| 5,472,576 | 12/1995 | Berberi | 203/3 |
| 5,478,443 | 12/1995 | Cogat | 202/153 |
| 5,618,432 | 4/1997 | Rewitzer et al. | 210/634 |

FOREIGN PATENT DOCUMENTS

| | | |
|---|---|---|
| 0 069 663 | 1/1983 | European Pat. Off. |
| 543 102 | 8/1922 | France . |
| 2 551 988 | 3/1985 | France . |
| 1 096 221 | 12/1967 | United Kingdom . |

*Primary Examiner*—Nina Bhat
*Attorney, Agent, or Firm*—Wenderoth, Lind & Ponack, L.L.P.

[57] ABSTRACT

A solvent recovery method and apparatus recover waste wash liquid generated in automatic washing of a printing machine so as to enable a printing machine washing of high productivity, excellent safety and health effect, and low cost. The solvent recovery apparatus has a gravity separation tank (1) for receiving waste wash liquid used for washing of the printing machine and separating it by a specific gravity difference. A vaporizer (2) receives, heats and vaporizes the separated liquid from the tank (1) in order from a lower layer liquid (H) to an upper layer liquid (L). A condenser (3) receives, cools and condenses, by water (W), the vapor from the vaporizer (2). A distillate gravity separation tank (4) receives liquid from the distillate gravity separation tank (4) receives liquid from the condenser (3) and holds it statically to separate the liquid into organic solvent (S) and water (W).

20 Claims, 5 Drawing Sheets

METHOD AND APPARATUS FOR SOLVENT RECOVERY FROM WASTE WASH LIQUID OF PRINTING MACHINE

BACKGROUND OF THE INVENTION

1. Field of the Invention

The present invention relates to a method and an apparatus for solvent recovery from waste wash liquid of a printing machine. Solvent is separated and regenerated to be recovered from waste wash liquid generated when ink stuck on a printing machine, especially on a sheet-fed printing press, is dissolved and washed by the solvent.

2. Description of the Prior Art

As shown in FIG. 6, a sheet-fed printing press 6 consists usually of an ink pot 6a, an ink fountain roller 6b, a ductor 6c, an inking roller group 6d, a damping device 6g, a plate cylinder 6e, a blanket cylinder 6f, etc.

When a printing is made on a sheet of paper P by use of the sheet-fed printing press, ink I stored in the ink pot 6a is transferred from the ink fountain roller 6b to the inking roller group 6d, and further from the inking roller group 6d to the plate cylinder 6e. Damping water W is applied to the plate cylinder 6e by the damping device 6g so that a printing image is formed there, and this printing image is transferred to the sheet of paper P via the blanket cylinder 6f.

In the sheet-fed printing press, when it is time to change the printing content (a plate change), a change of the kind of ink that has so far been used (a color change) may be required. Upon completion of printing work, the machine, without being left as it is, must be prepared for the next start of printing work. In such a case, in order to avoid generating of printing failures and increasing the loss of paper, it is indispensable to remove any ink, paper dust, etc. stuck on each portion of the printing machine and to make it clean.

Such removal and cleaning of the ink, paper dust, etc. stuck on each portion of the printing machine in the prior art is done by a washing device 7. That is, ink I of the ink pot 6a is first taken out, the residual ink I is scraped by an ink spatula, then the ink remaining in the ink pot 6a and the ink fountain roller 6b is wiped off by pieces of cloth soaked with a wash liquid (consisting of a hydrocarbon race organic solvent of a boiling point of 150° to 250° C.).

As for the inking roller group 6d, it is disengaged from the plate cylinder 6e. While the inking roller group 6d only is rotated, wash liquid is jetted or dropped from a wash nozzle 7a disposed thereabove. By so doing, the residual ink stuck on the inking roller group 6d is softened and moved together with the wash liquid to be transferred to a doctor roller 6h. This mixture of waste wash liquid and ink transferred onto the surface of the doctor roller 6h is scraped by a doctor blade 7b to be collected in a wash liquid pan 7c.

As the sticking of ink, paper dust, starch powder, etc. on the blanket cylinder 6f causes deterioration of the ink transfer to the paper P, removal thereof must be done very carefully. Hence, the blanket cylinder 6f is inched or moved slowly, and wash liquid is poured or wiping with pieces of cloth soaked with wash liquid is performed. Particularly, paper dust, being hardly removed, are wiped off by pieces of cloth soaked with water. Recently, a system has been disclosed wherein washing is automatically done by use of a brush or a roller while water and wash liquid are alternately supplied.

In the customary washing work of printing machines, which is mainly dependent on manual work, there are problems in that, as much work time is being required, productivity is low. Workers long term inhalation of vapor of wash liquid consisting mainly of organic solvent may be unhealthy. The sticking of ink to the body or clothing looks dirty. There is a danger of being caught in rotating rollers, though slowly hence, in order to resolve these and other problems, there is now a tendency to automate wash work by use of a large amount of wash liquid for the washing of the ink.

With automating the wash work, however, problems arise in that the cost of wash liquid increases. As the generated waste wash liquid, being colored by ink, will cause, if disposed of as it is, environmental pollution such as water contamination, etc., it is required to be burned or consigned for disposal to waste disposal enterprises, which greatly increases cost.

As mentioned above, in the wash work of printing machines, particularly in the case of manual work, there are problems of low productivity, health, dirt, lack of safety, like an accident of being caught in the rollers, etc. On the other hand, if automatic washing using a large amount of wash liquid is performed for resolving the above problems with manual work, a cost increase of the wash liquid, as well as that of pollution control, are brought about.

SUMMARY OF THE INVENTION

It is therefore an object of the present invention to provide a method and an apparatus for recovering solvent from waste wash liquid of a printing machine generated mainly in an automatic washing of the printing machine so as to enable a printing machine washing of the high productivity, excellent safety and health effects and low cost.

In order to attain the object, the present invention provides a solvent recovery method from waste wash liquid of printing machine, comprising following steps. Firstly there is a step of waste wash liquid gravity separation, wherein waste wash liquid generated when ink, paper dust, starch powder, etc., stuck on an ink pot, an inking roller group, a plate cylinder, a blanket cylinder, an impression cylinder, etc., composing a printing machine such as a sheet-fed printing press etc., are washed to be removed by organic solvent and water, is received and held statically. Gravity separation is thereby made into two layers, a heavy liquid of large specific gravity consisting mainly of water, and a light liquid of small specific gravity consisting mainly of organic solvent.

Next, there is a step of distillation for obtaining distillate. The heavy liquid of the lower layer separated by the waste wash liquid gravity separation step is taken out to be heated and boiled of water. Subsequent to vaporization of the water being substantially completed, the light liquid of the upper layer is taken out to be heated and boiled of organic solvent. The vapor obtained is indirectly cooled to be condensed. The heating is preferably made indirectly.

Distillate separation is performed wherein the distillate obtained by the distillation step is held statically. Gravity separation is thereby made into two layers of water and organic solvent.

According to the solvent recovery method of the present invention, organic solvent can be regenerated and recovered for reuse from waste wash liquid of the printing machine. The cost burden for the organic solvent can be reduced, automating the wash work of printing machine using a large amount of organic solvent thereby becomes possible, productivity of the washing is enhanced and workers are released from dirty and dangerous work.

Incidentally, bumping caused when a mixture of heavy liquid and light liquid, of which the boiling points are greatly different from each other, is vaporized can be prevented by the heavy liquid and the light liquid being separated in advance. By so doing, a compact size of a vaporizer and accompanying prevention of ink mist can be realized.

Further, in order to attain the object, the present invention provides a solvent recovery apparatus far waste wash liquid of a printing machine comprising following construction.

A waste wash liquid gravity separation tank receives waste wash liquid of the printing machine where it is held statically. Gravity separation is thereby made into two layers, a heavy liquid of large specific gravity consisting mainly of water, and a light liquid of small specific gravity consisting mainly of organic solvent.

A vaporizer receives firstly the heavy liquid of the lower layer from the waste wash liquid gravity separation tank to heated, preferably to heat indirectly, and boil water. Subsequently, to vaporization of water being substantially completed, it receives the light liquid of the upper layer to heat and boil the organic solvent.

Solvent recovery apparatus according to the present invention further comprises a condenser for condensing vapor from the vaporizer, by preferably indirect cooling and a gravity separation tank for receiving and holding statically liquid from the condenser, thereby making gravity separation into two layers of water and organic solvent.

In the present invention, the vaporizer used for the solvent recovery apparatus the from the waste wash liquid of the printing machine is preferably of a construction comprising an agitator and an external heater. Incidentally, the temperature of the vaporizer heating surface in contact with the liquid is made to 230° C. or less. Scaling of ink on the vaporizer heating surface can thereby be completely prevented.

Further, the vaporizer will be preferably if it is of a construction comprising therein a mist catching mechanism, as ink mist accompanying the vapor can be removed easily, and a compact size of the vaporizer can be realized.

The mist catching mechanism provided in the vaporizer may be of a construction in which a plurality of shelves, having openings through which vapor is upwardly passable, are provided with spaces in the vertical direction so that the openings of adjacent shelves may not overlap with each other in the vertical direction. Thereby the flow of the generated vapor can be suddenly bent.

Further, the mist catching mechanism may be of a construction in which a weir is provided around the edge of each shelf opening so that liquid on the shelf may not fall. A cap is provided above the opening, with its lower peripheral edge being dipped in the liquid so as to cover the weir. Vapor, going up through the opening, can pass over the weir and go through the liquid on the shelf.

According to the solvent recovery apparatus, an apparatus which is able to make an efficient solvent recovery by use of above-mentioned solvent recovery method from waste wash liquid of the printing machine according to the present invention is provided.

DESCRIPTION OF THE PREFERRED EMBODIMENTS

Figure 1:
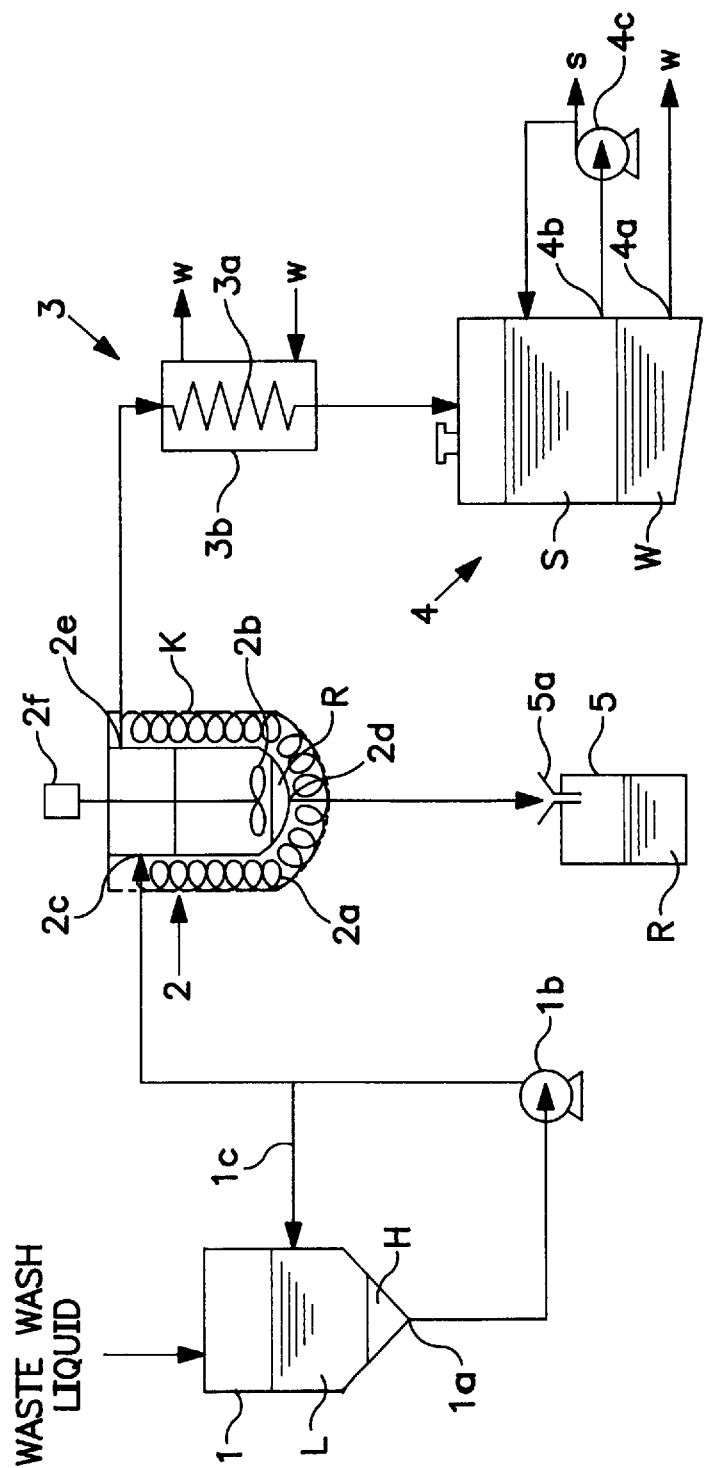
FIG. 1 is a constructional view showing an arrangement of a solvent recovery apparatus for waste wash liquid of a printing machine of a first preferred embodiment according to the present invention.

Hereinafter, description is made concretely on preferred embodiments of a solvent recovery method and apparatus from waste wash liquid of a printing machine according to the present invention with reference to FIGS. 1 to 4. Before that, a wash method of a printing machine is first described with reference to FIG. 5.

Before washing of the printing machine is carried out, a blanket cylinder 6f is wound with cloth or molton for wiping the surface thereof and a wash drum 8a is provided so as to make rotating contact with the blanket cylinder only while washing. Wash nozzles 8b, 8c, 8d and 8e for pouring (or jetting) organic solvent (and/or water) are provided respectively above an ink pot 6a, an inking roller group 6d, a doctor blade 7b and the wash drum. Waste liquid receivers 8f, 8g and 8h are provided respectively below the ink pot 6a, the doctor blade 7b and the wash drum 8a.

At the time of the washing of the printing machine, ink I in the ink pot 6a is taken out, and while the rollers are moved slowly, the wash nozzles 8b, 8c and 8d are opened respectively for the ink pot 6a, the ink roller group 6d and the doctor blade 7b, in turn from the upstream side. Thus organic solvent is poured repeatedly (solvent S recovered from the solvent recovery apparatus is used actively) and residual ink is washed. At this time, it is desirable to disengage the inking roller group 6d and a plate cylinder 6e.

Upon completion of washing of the upper rollers, the wash drum 8a makes contact with the blanket cylinder 6f, and while the blanket cylinder 6f is rotating, organic solvent S is poured from the wash nozzle 8e to the wash drum 8a. The surface of the blanket cylinder 6f is wiped by cloth or molton wetted by the organic solvent. Ink, paper dust, starch powder, etc., stuck on the plate cylinder 6e and the blanket cylinder 6f, are thereby removed.

In place of organic solvent, organic solvent in which water is dispersed or water only, as the case may be, can be used. The waste wash liquid received in the waste liquid receivers 8f, 8g and 8h is transferred to a waste wash liquid gravity separation tank or stored in a waste liquid reservoir.

Preferred embodiments of solvent recovery method and apparatus according to the present invention for recovering solvent from waste wash liquid generated by washing of the printing machine, as mentioned above, are now described.

(First Preferred Embodiment)

The first preferred embodiment is described with reference to FIG. 1. In FIG. 1, numeral 1 designates a waste wash liquid gravity separation tank, which receives from above, and holds statically, the waste wash liquid containing organic solvent and water used for washing of the printing machine as well as ink, paper dust, starch powder, etc., as mentioned above. Gravity separation is performed into two layers of a heavy liquid of large specific gravity consisting mainly of water and a light liquid of small specific gravity consisting mainly of organic solvent.

Construction is made so that the separated liquid in the gravity separation tank 1 is taken out from a discharge port 1a provided at the lower portion and is sent to a vaporizer 2 of the next step by a liquid transfer pump 1b. Incidentally, piping 1c is provided so that the liquid sent from the liquid transfer pump 1b can also be returned to the waste wash liquid gravity separation tank 1.

Next, as to the vaporizer 2, numeral 2a designates an electric heater which is wound around the outer surface of the vaporizer 2 and is covered on its outer surface by a thermal insulation layer K of high heat insulation ability. Numeral 2b designates an agitator fitted to the center portion of an upper cover of the vaporizer 2, numeral 2c designates a liquid supply port, numeral 2d designates a waste ink discharge port provided at the bottom portion of the vaporizer 2, through which residue R consisting mainly of waste ink is discharged, numeral 2e designates a vapor discharge port and numeral 2f designates a motor for driving the agitator 2b.

Numeral 3 designates a condenser for cooling and condensing vapor from the vaporizer 2, which consists of a cooling pipe 3a for vapor and a cooling water jacket 3b for cooling water. Numeral 4 designates a distillate gravity separation tank for receiving, and holding statically, distillate from the condenser 3. Separation is thereby made into two layers, water W of large specific gravity and organic solvent S of small specific gravity.

The distillate gravity separation tank 4 comprises a water discharge port 4a provided at the lower portion thereof and a solvent discharge port 4b provided at the upper portion thereof. Numeral 4c designates a solvent discharge pump. Piping is provided so that the solvent can also be returned to the distillate gravity separation tank 4. Numeral 5 designates a waste ink tank for receiving the residue (waste ink) R stored on the bottom of the vaporizer 2 and numeral 5a designates a waste ink receiving port for receiving the waste ink.

Operation of the apparatus of FIG. 1, having the construction as mentioned above, is now described. The heavy liquid H of the lower layer of the waste wash liquid gravity separation tank 1 is introduced into the vaporizer 2, which is maintained at a temperature of 230° C. or less, to be heated indirectly and boiled of water. Subsequent to the evaporation of water being substantially completed, the light liquid L of the upper layer is supplied into the vaporizer 2 to be heated indirectly and boiled of organic solvent. The heavy liquid H and the light liquid L are thus separately treated, and bumping is thereby prevented.

Vapor generated at the vaporizer 2 is cooled to be condensed at the condenser 3 and introduced into the distillate gravity separation tank 4 to be statically held. Thus, solvent S can be effectively recovered from the waste wash liquid of printing machine.

(Second Preferred Embodiment)

Next, the second preferred embodiment according to the present invention is described with reference to FIGS. 2 to 4. Incidentally, the same or similar part in FIGS. 2 to 4 as those shown in FIG. 1 are denoted with the same numerals, and repeated description is omitted.

Figure 2:
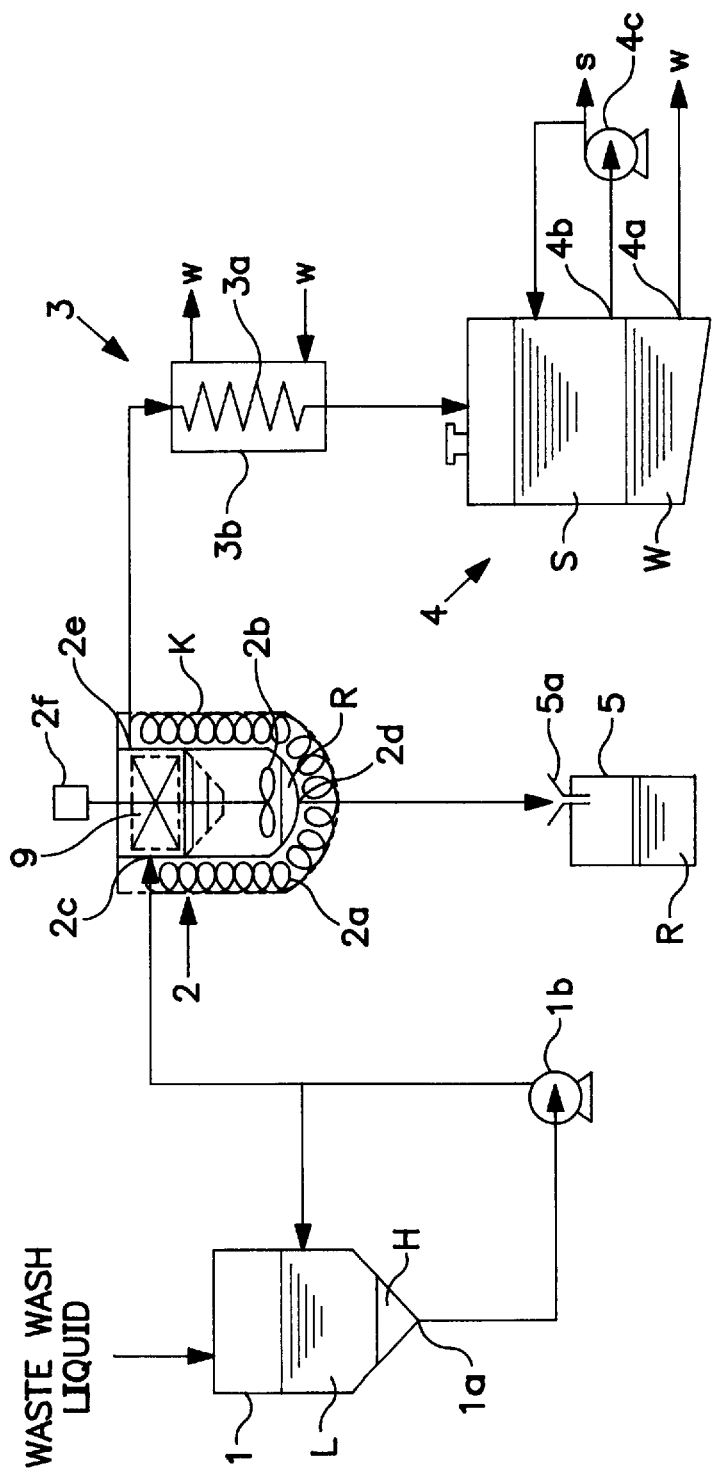
FIG. 2 is a constructional view showing an arrangement of a solvent recovery apparatus from waste wash liquid of a printing machine of a second preferred embodiment according to the present invention.

Within a vaporizer 2 of the apparatus shown in FIG. 2, there is provided a mist catcher 9 above the liquid level. A concrete construction of this mist catcher 9 is shown in FIGS. 3 and 4.

Figure 3:
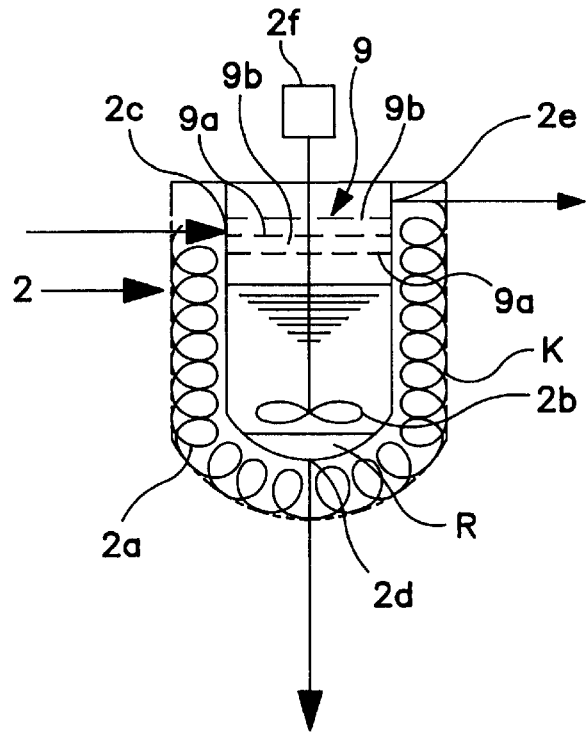
FIG. 3 is a constructional view showing one example of an arrangement of a vaporizer in the solvent recovery apparatus of FIG. 2.

In the mist catcher 9 shown in FIG. 3, a plurality of shelves 9a, having openings 9b through which vapor is upwardly passable, are provided with spaces in the vertical direction so that the openings of adjacent shelves may not overlap with each other in the vertical direction. The flow of generated vapor can thereby be bent suddenly. Thus, mist in the vapor generated at the vaporizer 2 can be caught easily, and a compact size of the vaporizer 2 can be realized.

Figure 4:
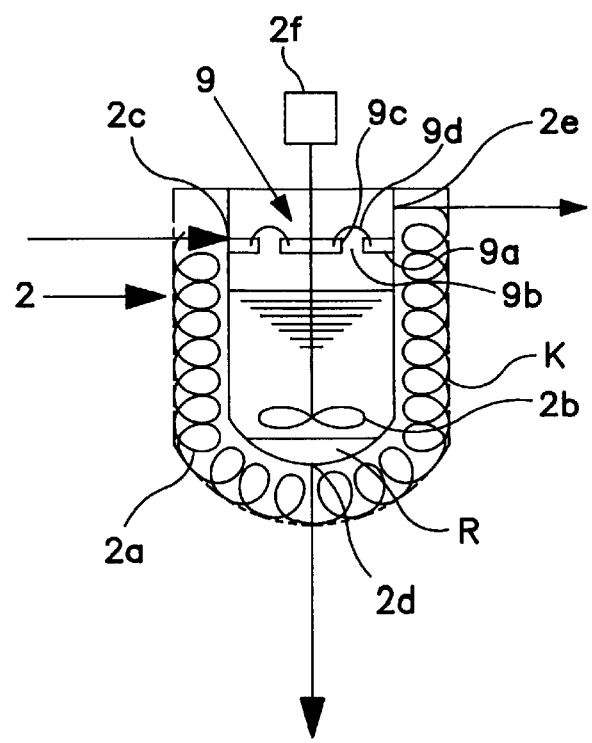
FIG. 4 is a constructional view showing another example of an arrangement of a vaporizer in the solvent recovery apparatus of FIG. 2.
Figure 5:
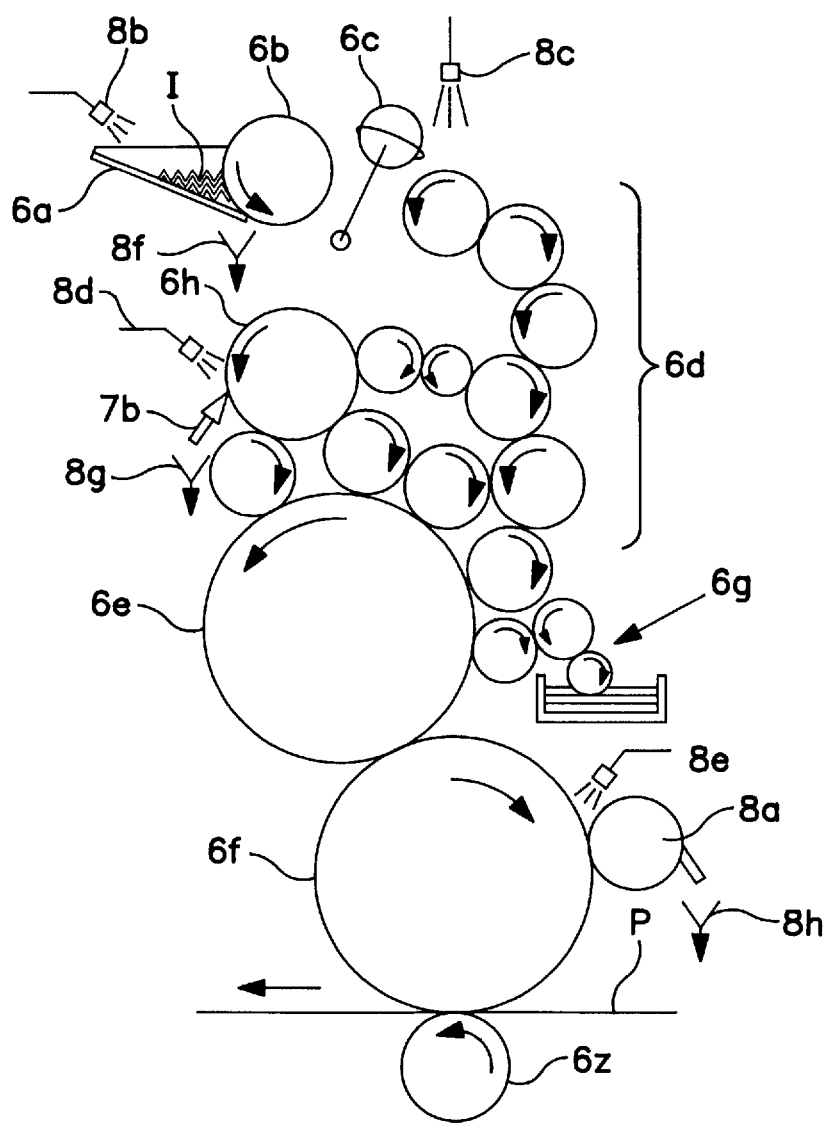
FIG. 5 is a constructional view for explaining wash operation of an printing machine.
Figure 6:
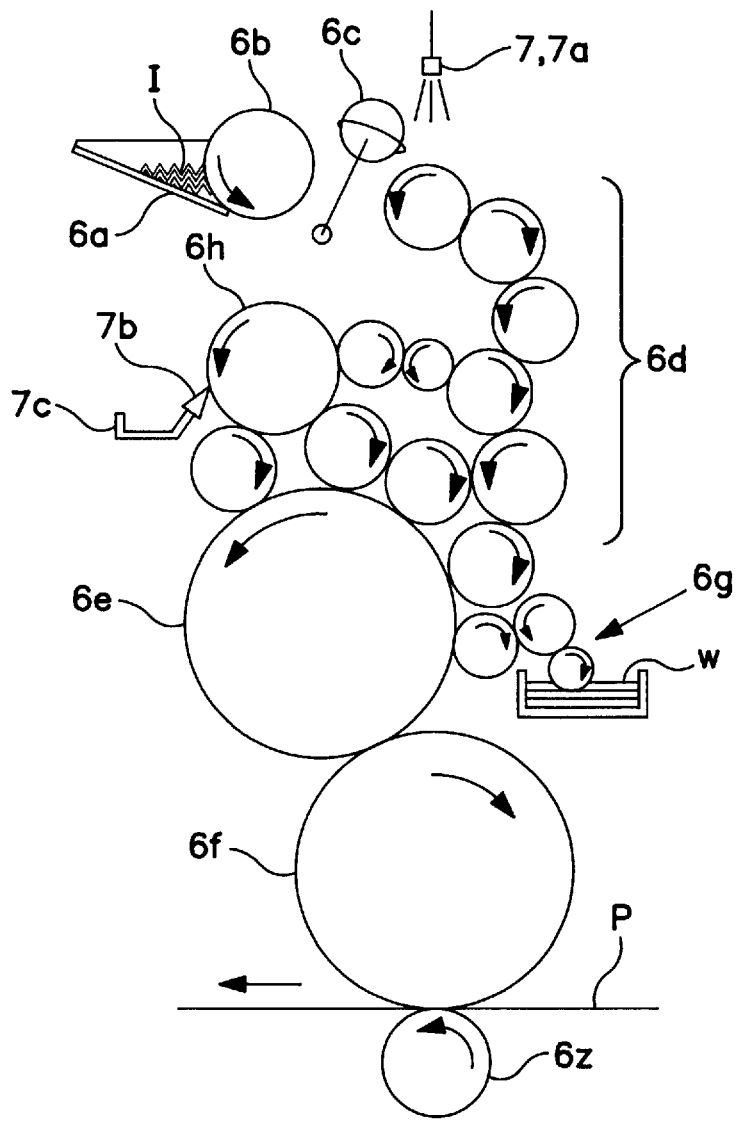
FIG. 6 is a constructional view for explaining wash operation of an printing machine in the prior art.

Next, in the mist catcher 9 shown in FIG. 4, a construction is made so that a plurality of openings 9b, through which vapor is passable, are provided at shelves 9a for storing liquid. A weir 9c is provided around the edge of each opening 9b so that liquid on the shelf 9a does not fall. A cap 9d is provided above the opening 9b with its lower peripheral edge being dipped in the liquid so as to cover the weir 9c. Vapor, going up through the opening 9b, can thereby pass over the weir 9c and go through the liquid on the shelf 9a.

Incidentally, by the mist catching mechanism 9 being so provided, as the mist in vapor can be caught easily, even the waste wash liquid gravity separation tank 1 may be omitted according to a case.

Other parts of the apparatus shown in FIG. 2 are substantially the same as those shown in FIG. 1.

According to the solvent recovery apparatus of FIG. 2, as the mist accompanying the vapor generated at the vaporizer 2 can be removed easily by the mist catcher 9, clear organic solvent S and water W, which are reusable for washing of the printing machine, can be recovered and the amount of residue, consisting mainly of ink (waste ink), which must otherwise be disposed of as waste, can be reduced to a minimum.

According to the present invention, as described above, the waste wash liquid is separated by a specific gravity difference. The separated waste liquid is heated and vaporized individually, the respective vapor is cooled to be condensed and held statically, and water and solvent, being separated by a specific gravity difference, are recovered.

By practicing the present invention, accordingly, as organic solvent can be regenerated and recovered to be reused, and the cost burden of the organic solvent can be reduced, it has become possible that the wash work of printing machine using a large amount of organic solvent is automated, productivity of washing is accordingly enhanced and workers are released from dirty and dangerous work.

Incidentally, bumping caused when a mixture of a heavy liquid and a light liquid, of which boiling points are greatly different from each other, is vaporized can be prevented by the heavy liquid H and the light liquid L being separated in advance. By so doing, a compact size of the vaporizer and prevention of accompanying ink mist can be realized.

Especially, according to the solvent recovery apparatus of the present invention in which a mist catcher is provided within the vaporizer, the mist accompanying with the vapor generated at the vaporizer can be removed easily, clear organic solvent S and water W, which are reusable for washing of the printing machine, can be recovered and the amount of residue, consisting mainly of ink (waste ink), which must otherwise be disposed, as waste, can be reduced to a minimum.

It is understood that the invention is not confined to the particular construction and arrangement of parts herein illustrated and described but embraces such modified forms thereof as come within the scope of the following claims.

What is claimed is:

1. A solvent recovery method for recovering solvent from printing machine waste wash liquid that is used for washing ink stuck on a printing machine, said method comprising:

collecting printing machine waste wash liquid that includes a solvent and that has been used for washing ink stuck on a printing machine;

separating the waste wash liquid, using a difference in specific gravity between components of the waste wash liquid, into a lower layer of separated waste wash liquid and an upper layer of separated waste wash liquid, one of the layers comprising the solvent;

heating and vaporizing the waste wash liquid of the lower layer;

heating and vaporizing the waste wash liquid of the upper layer;

cooling and condensing the vapor that is generated by said steps of heating from both the waste wash liquid of the lower layer and the waste wash liquid of the upper layer; and statically holding the cooled and condensed vapor from said step of cooling and condensing so as to separate the cooled and condensed vapor by using differences in specific gravity, thereby separating the solvent.

2. The method of claim 1, wherein the wash liquid comprises water and the solvent, and said step of separating separates the water from the solvent.

3. A method comprising:

automatically washing a printing machine by applying a wash liquid comprising a solvent over components of the printing machine so as to wash ink stuck on the components of the printing machine from the components of the printing machine, thereby generating waste wash liquid;

collecting the printing machine waste wash liquid that includes a solvent and that has been used for washing ink stuck on a printing machine;

separating the waste wash liquid, using a difference in specific gravity between components of the waste wash liquid, into a lower layer of separated waste wash liquid and an upper layer of separated waste wash liquid, one of the layers comprising the solvent;

heating and vaporizing the waste wash liquid of the lower layer;

heating and vaporizing the waste wash liquid of the upper layer;

cooling and condensing the vapor that is generated by said steps of heating from both the waste wash liquid of the lower layer and the waste wash liquid of the upper layer; and statically holding the cooled and condensed vapor from said step of cooling and condensing so as to separate the cooled and condensed vapor by using differences in specific gravity, thereby separating the solvent.

4. The method of claim 3, wherein the wash liquid comprises water and the solvent, and said step of separating separates the water from the solvent.

5. A solvent recovery apparatus for recovering solvent from a printing machine waste wash liquid that is used for washing ink stuck on a printing machine, comprising:

a first gravity separating means for receiving printing machine waste wash liquid that has been used for washing ink stuck on the printing machine and for separating the waste wash liquid into a lower layer and an upper layer by using a difference in specific gravity between components of the waste wash liquid;

a vaporizing means for receiving, heating and vaporizing liquid from said first gravity separating means in order from the lower layer to the upper layer;

a means for cooling and condensing vapor from said vaporizing means; and a second gravity separating means for receiving liquid from said means for cooling and condensing and statically holding the liquid so as to separate the liquid into components thereof.

6. The solvent recovery apparatus of claim 5, wherein said vaporizing means comprises:

a vessel;

an agitator for agitating liquid in said vessel; and an external heater external of said vessel for indirectly heating the liquid in said vessel.

7. The solvent recovery apparatus of claim 6, wherein said vaporizing means further comprises a mist catcher in said vessel.

8. The solvent recovery apparatus of claim 7, wherein said mist catcher comprises a plurality of shelves having openings through which vapor can upwardly pass, said plurality of shelves being vertically spaced such that said openings of vertically adjacent ones of said plurality of shelves do not overlap in the vertical direction, whereby the upward flow of vapor is bent.

9. The solvent recovery apparatus of claim 7, wherein said mist catcher comprises:

a shelf having an opening through which vapor can upwardly pass, said opening having an edge;

a weir provided around the edge of said opening of said shelf for storing liquid; and a cap provided above said opening having a lower peripheral edge dipped in the liquid so as to cover the weir, whereby vapor passing upwardly through the opening can pass over the weir and go through the liquid.

10. The solvent recovery apparatus of claim 5, wherein said vaporizing means further comprises a mist catcher in said vessel.

11. The solvent recovery apparatus of claim 10, wherein said mist catcher comprises a plurality of shelves having openings through which vapor can upwardly pass, said plurality of shelves being vertically spaced such that said openings of vertically adjacent ones of said plurality of shelves do not overlap in the vertical direction, whereby the upward flow of vapor is bent.

12. The solvent recovery apparatus of claim 10, wherein said mist catcher comprises:

a shelf having an opening through which vapor can upwardly pass, said opening having an edge;

a weir provided around the edge of said opening of said shelf for storing liquid; and a cap provided above said opening having a lower peripheral edge dipped in the liquid so as to cover the weir, whereby vapor passing upwardly through the opening can pass over the weir and go through the liquid.

13. An apparatus, comprising:

a plurality of wash nozzles positioned adjacent to components of a printing machine for supplying a wash liquid to the components of the printing machine for the purpose of washing ink stuck on the components of the printing machine;

a plurality of waste liquid receivers positioned relative to said printing machine for receiving printing machine waste wash liquid that has been supplied by said plurality of nozzles and used for washing the ink stuck on the components of the printing machine;

a first gravity separation means for receiving the printing machine waste wash liquid that has been used for washing the ink stuck on the components of the printing machine and for separating the waste wash liquid into a lower layer and an upper layer by using a difference in specific gravity between components of the waste wash liquid;

a vaporizing means for receiving, heating and vaporizing liquid from said first gravity separation means in order from the lower layer to the upper layer;

a means for cooling and condensing vapor from said vaporizing means; and a second gravity separation means for receiving liquid from said means for cooling and condensing and statically holding the liquid so as to separate the liquid into components thereof.

14. The solvent recovery apparatus of claim 13, wherein said vaporizing means comprises:

a vessel;

an agitator for agitating liquid in said vessel; and an external heater external of said vessel for indirectly heating the liquid in said vessel.

15. The solvent recovery apparatus of claim 14, wherein said vaporizing means further comprises a mist catcher in said vessel.

16. The solvent recovery apparatus of claim 15, wherein said mist catcher comprises a plurality of shelves having openings through which vapor can upwardly pass, said plurality of shelves being vertically spaced such that said openings of vertically adjacent ones of said plurality of shelves do not overlap in the vertical direction, whereby the upward flow of vapor is bent.

17. The solvent recovery apparatus of claim 15, wherein said mist catcher comprises:

a shelf having an opening through which vapor can upwardly pass, said opening having an edge;

a weir provided around the edge of said opening of said shelf for storing liquid; and a cap provided above said opening having a lower peripheral edge dipped in the liquid so as to cover the weir, whereby vapor passing upwardly through the opening can pass over the weir and go through the liquid.

18. The solvent recovery apparatus of claim 13, wherein said vaporizing means further comprises a mist catcher in said vessel.

19. The solvent recovery apparatus of claim 18, wherein said mist catcher comprises a plurality of shelves having openings through which vapor can upwardly pass, said plurality of shelves being vertically spaced such that said openings of vertically adjacent ones of said plurality of shelves do not overlap in the vertical direction, whereby the upward flow of vapor is bent.

20. The solvent recovery apparatus of claim 18, wherein said mist catcher comprises:

a shelf having an opening through which vapor can upwardly pass, said opening having an edge;

a weir provided around the edge of said opening of said shelf for storing liquid; and a cap provided above said opening having a lower peripheral edge dipped in the liquid so as to cover the weir, whereby vapor passing upwardly through the opening can pass over the weir and go through the liquid.

* * * * *